(12) United States Patent
Galindo Verdasco

(10) Patent No.: US 9,083,868 B2
(45) Date of Patent: Jul. 14, 2015

(54) SUPPORTING MEANS FOR VIDEO SURVEILLANCE

(75) Inventor: Pedro Galindo Verdasco, Madrid (ES)

(73) Assignee: TPTI, S.L.U., Talamanca del Jarama (Madrid) (ES)

( * ) Notice: Subject to any disclaimer, the term of this patent is extended or adjusted under 35 U.S.C. 154(b) by 0 days.

(21) Appl. No.: 14/124,263

(22) PCT Filed: May 17, 2012

(86) PCT No.: PCT/ES2012/000138
§ 371 (c)(1),
(2), (4) Date: Dec. 6, 2013

(87) PCT Pub. No.: WO2012/168507
PCT Pub. Date: Dec. 13, 2012

(65) Prior Publication Data
US 2014/0111683 A1   Apr. 24, 2014

(30) Foreign Application Priority Data

Jun. 8, 2011   (ES) .............................. 201100539 U

(51) Int. Cl.
| H04N 7/18 | (2006.01) |
| H04N 5/225 | (2006.01) |
| F16M 11/10 | (2006.01) |
| F16M 11/20 | (2006.01) |
| F16M 11/18 | (2006.01) |
| F16M 13/02 | (2006.01) |
| G08B 13/196 | (2006.01) |

(52) U.S. Cl.
CPC ............ *H04N 5/2252* (2013.01); *F16M 11/10* (2013.01); *F16M 11/18* (2013.01); *F16M 11/2014* (2013.01); *F16M 13/027* (2013.01); *G08B 13/1963* (2013.01); *G08B 13/19619* (2013.01)

(58) Field of Classification Search
CPC ................................................... H04N 5/2252
USPC .................... 348/373, 151; 396/427; 358/108
See application file for complete search history.

(56) References Cited

U.S. PATENT DOCUMENTS

| 4,225,881 A * | 9/1980 | Tovi ............................... 348/151 |
| 4,989,466 A | 2/1991 | Goodman |
| 7,616,229 B2 * | 11/2009 | Wada et al. ................... 348/151 |
| 2004/0032492 A1 | 2/2004 | Wada et al. |
| 2005/0259985 A1 | 11/2005 | Mulvey et al. |
| 2007/0041727 A1 * | 2/2007 | Lee ............................... 396/427 |
| 2010/0110192 A1 | 5/2010 | Johnston et al. |

OTHER PUBLICATIONS

International Search Report of PCT/ES2012/000138 dated Jul. 17, 2012.

* cited by examiner

*Primary Examiner* — Joel Fosselman
(74) *Attorney, Agent, or Firm* — Lucas & Mercanti, LLP

(57) ABSTRACT

The present invention relates to a support for video surveillance, formed by a supporting column on which there is rotationally assembled a horizontal disc having a rotation-actuating motor, whereas in said disc there is swivel-mounted at least one video camera having a respective swivel-actuating motor, the entire functional assembly being included inside a transparent protective bubble.

6 Claims, 5 Drawing Sheets

SUPPORTING MEANS FOR VIDEO SURVEILLANCE

CROSS REFERENCE TO RELATED APPLICATION

This Application is a 371 of PCT/ES2012/000138 filed on May 17, 2012, which claims the priority of Spanish Application No U201100539 filed on Jun. 8, 2011 both applications are incorporated herein by reference in their entirety.

FIELD OF THE ART

The present invention relates to the devices of video surveillance arranged for controlling the presence and activity of objects and/or people in specific places, proposing a support that allows incorporating video surveillance cameras under advantageous functional conditions.

STATE OF THE ART

Video surveillance cameras are known to be placed to control the presence and activity of people, animals or objects in places requiring security control, thus replacing the people being there for that control function, whereby achieving an economic advantage and the elimination of personal risks.

Conventional video surveillance systems are based on video cameras arranged in strategic places in order to observe all the areas of places to be controlled, said cameras being able to be fixed cameras, whereby requiring a large number of cameras to cover all the areas of observation, or motor-powered cameras with orientation movement, whereby all the areas of observation can be covered with one or a few cameras.

Motor-powered cameras for such purpose are rotationally assembled in a support, being able to rotate vertically and horizontally, the arrangement of the assembly determining a limitation of the angle of orientation of the camera in the directions of the surrounding area.

OBJECT OF THE INVENTION

According to the invention, a support for video surveillance is proposed, being made with constructive and functional features making it advantageous for said function.

This support object of the invention comprises a supporting column having an anchoring base at one of its ends, there being assembled on said column a horizontal rotating disc having an actuation motor, whereas on the periphery of the disc there is at least one vertically swivel-mounted video camera with a respective swivel-actuating motor.

A support in which the video camera is moved laterally with respect to the supporting column is thus provided, such that when the disc on which said camera is arranged rotates, said camera rotates around the supporting column, which combined with the vertical swivel movement of the camera, determines an orientation capacity that allows completely observing all of the surrounding area.

The functional assembly of the support is arranged inside a transparent bubble acting as a protection with respect to external agents such as dust, insects, etc., a visor cover for rain, hail, etc., and for preventing the rays of the sun from striking the video camera, being able to be arranged in the upper portion above said bubble.

The anchoring base of the supporting column is removable, being able to be placed at either of the ends of said supporting column, such that with the same type of anchoring the support can be arranged such that it is supported by the lower portion or such that it is hung from the upper portion, depending on the convenience in each case of application.

There is furthermore envisaged on the supporting column the possibility of additionally placing one or several fixed cameras by means of an accessory frame secured to said supporting column, whereby determining a mixed moving camera-fixed camera assembly making the function of the support for video surveillance more efficient.

As a result, said support object of the invention has very advantageous features, acquiring its own identity and preferred character for the video surveillance camera installation function for which it is intended.

DETAILED DESCRIPTION OF THE INVENTION

Figure 1:
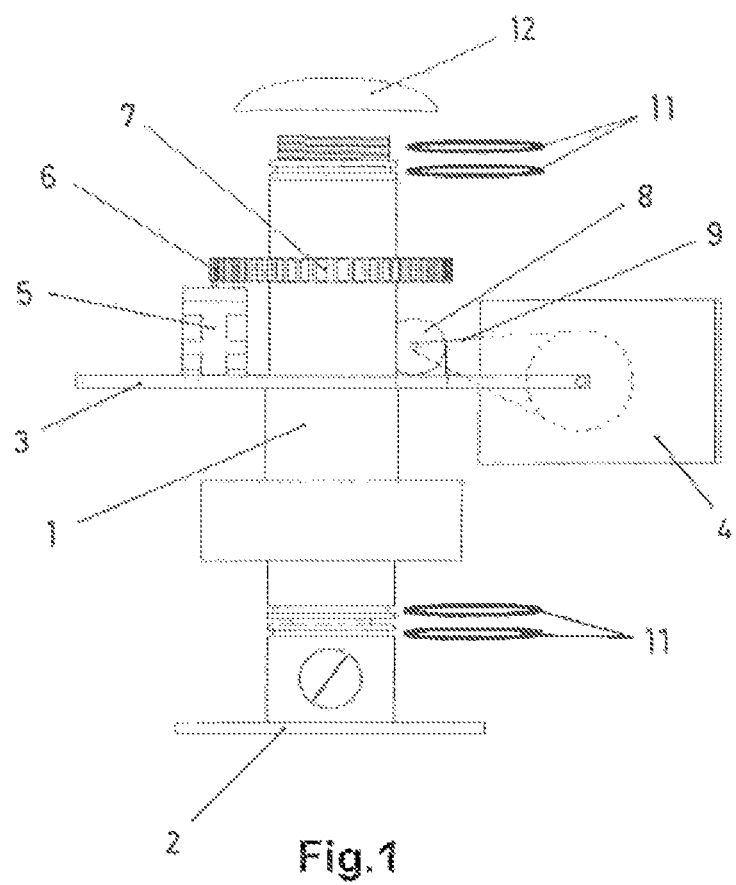
FIG. 1 schematically shows an embodiment of the support object of the invention with a moving video camera arranged such that it is supported by the lower portion, without the protective bubble of the functional assembly.

The object of the invention relates to a support for holding video surveillance cameras, with which conditions for orienting the video surveillance system that allows advantageously observing the entire area surrounding the installation can be established.

The proposed support comprises a supporting column (1) provided with an anchoring base (2) at one of the ends, there being rotationally assembled on said column (1) a horizontal disc (3), on the periphery of which there is vertically swivel-mounted at least one video camera (4).

Therefore, by means of the rotation of the disc (3) on the supporting column (1) the video camera (4) rotates horizontally around said supporting column (1), that movement being able to be combined with the vertical swivel movement of the video camera (4) on the disc (3), which allows orienting the video camera (4) to completely observe the entire area surrounding the installation.

The rotation of the disc (3) on the supporting column (1) is actuated by means of a motor (5) arranged in the actual disc (3), and according to a practical embodiment, meshing with a pinion (6) on an annular gear ring (7) arranged in the supporting column (1). The actuation of the rotation of the disc (3) is transmitted by means of the meshing of a pinion (6) of the actuating motor (5) on a gear ring (7) of the column (1), having no limiting character, any other type of transmission carrying out the same function being able to be arranged.

The vertical swivel movement of the video camera (4) is in turn actuated by means of a respective motor (8) that is also arranged in the disc (3) and, according to a practical embodiment, connected to the video camera (4) by means of a belt transmission (9) or the like. The transmission of the vertical swivel actuation of the video camera (4) from the actuating motor (8) by means of a belt or similar means does not have a limiting character either, any other type of transmission carrying out the same function likewise being able to be established.

Figure 2:
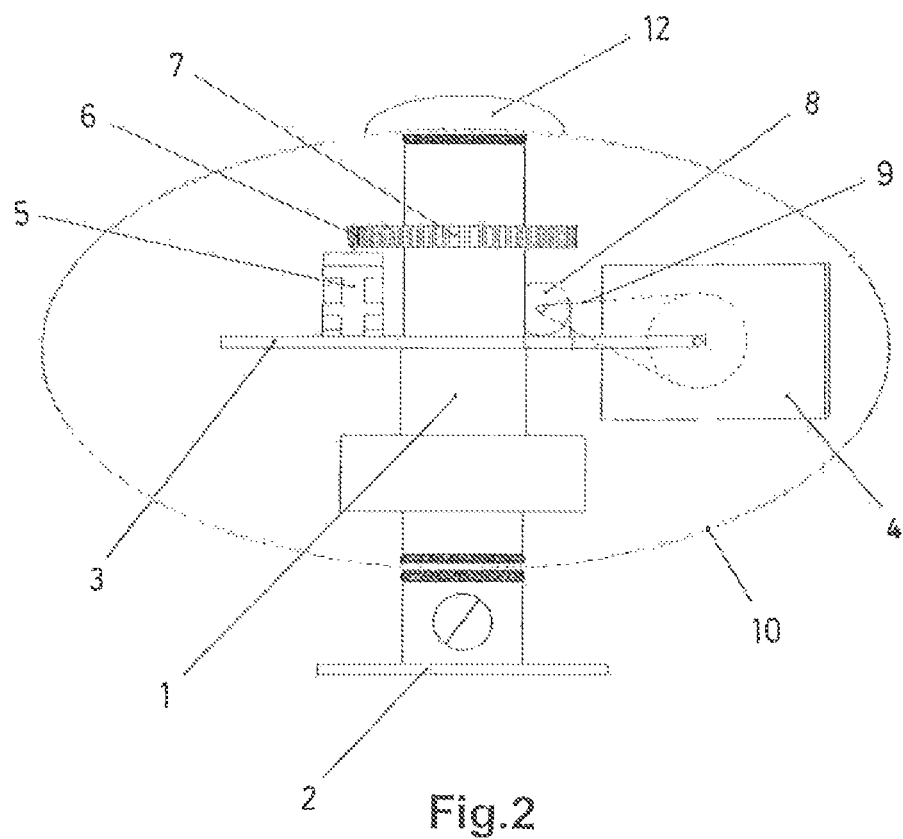
FIG. 2 is a view of the fully assembled support, provided with the protective bubble of the functional assembly.

The functional assembly of the support is arranged inside a transparent protective bubble (10) which is mounted with respect to the supporting column (1) with gaskets (11), a closure cover (12) securing said transparent bubble (10) being incorporated at the free end of the supporting column (1), as seen in FIG. 2.

Figure 3:
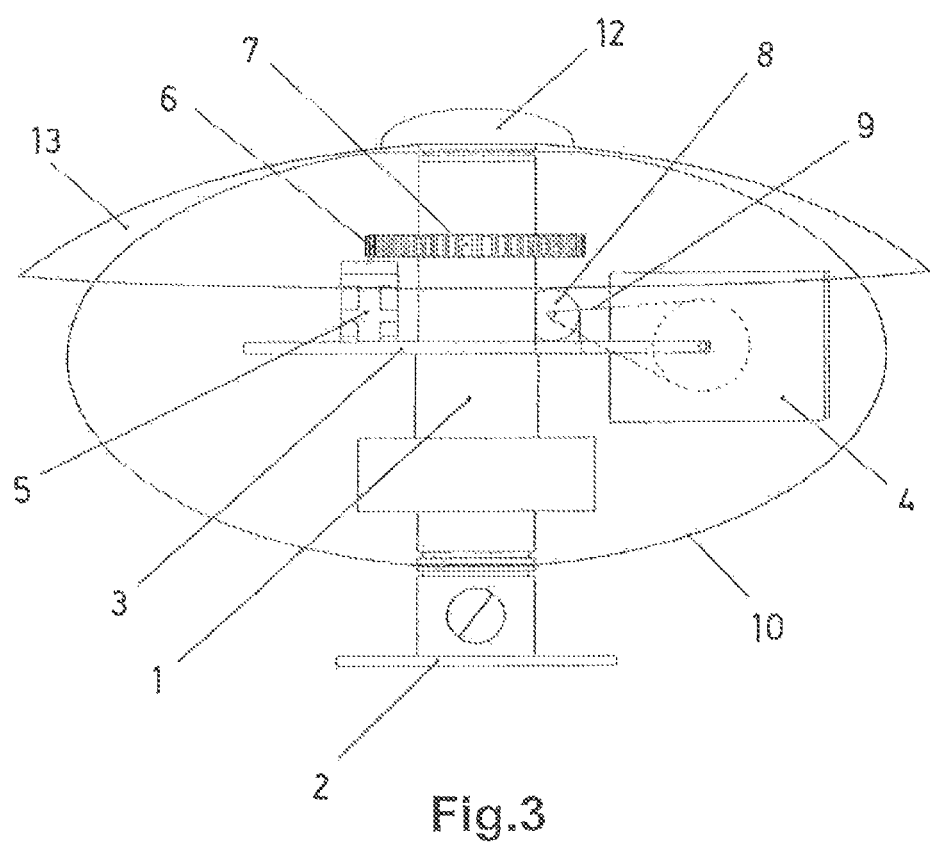
FIG. 3 is a view of the support with a visor cover above the upper portion of the protective bubble of the functional assembly.

A visor cover (13) can furthermore be incorporated in the upper portion, above the transparent bubble (10), as seen in FIG. 3, to protect against rain, hail, etc., and to prevent the rays of the sun from striking the video camera (4) which could hinder clarity of the images it provides.

Figure 4:
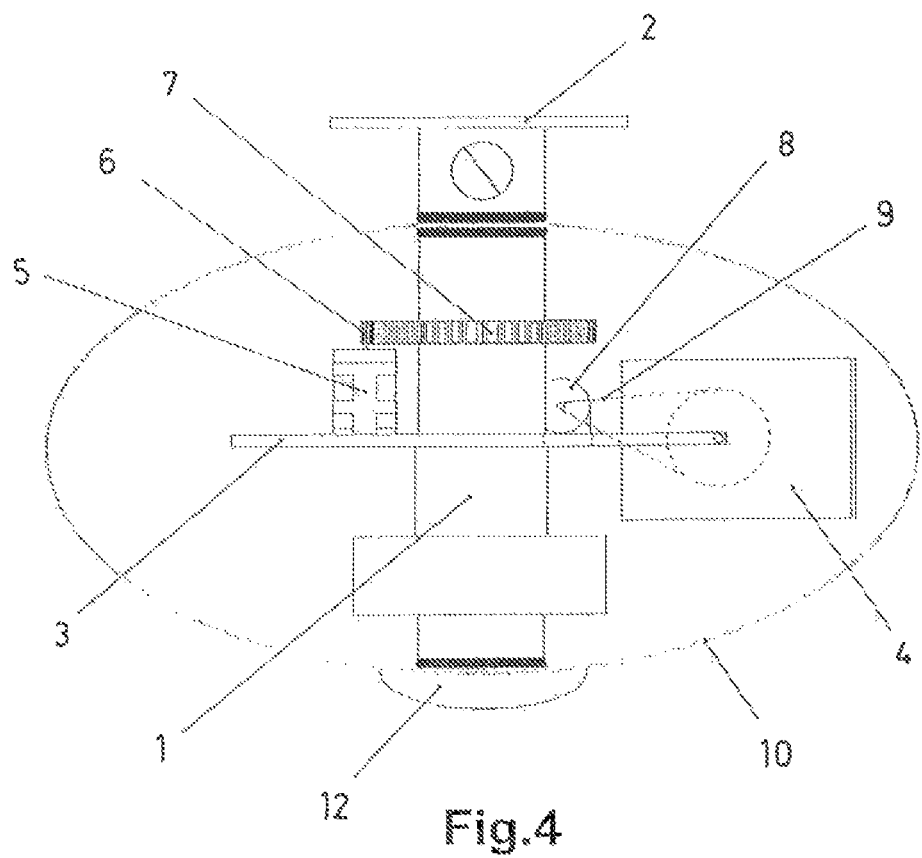
FIG. 4 is a view of the support arranged such that it is hung from the upper portion.

The anchoring base (2) is removable and can be placed at either of the ends of the supporting column (1), the closing cover (12) being arranged in each case at the opposite end, such that by means of placing the anchoring base (2) in one position or the other, the support can be arranged such that it is supported by the lower portion, as seen in FIGS. 2 and 3, or such that it is hung from the upper portion, as seen in FIG. 4, with the same structural elements of the support.

Figure 5:
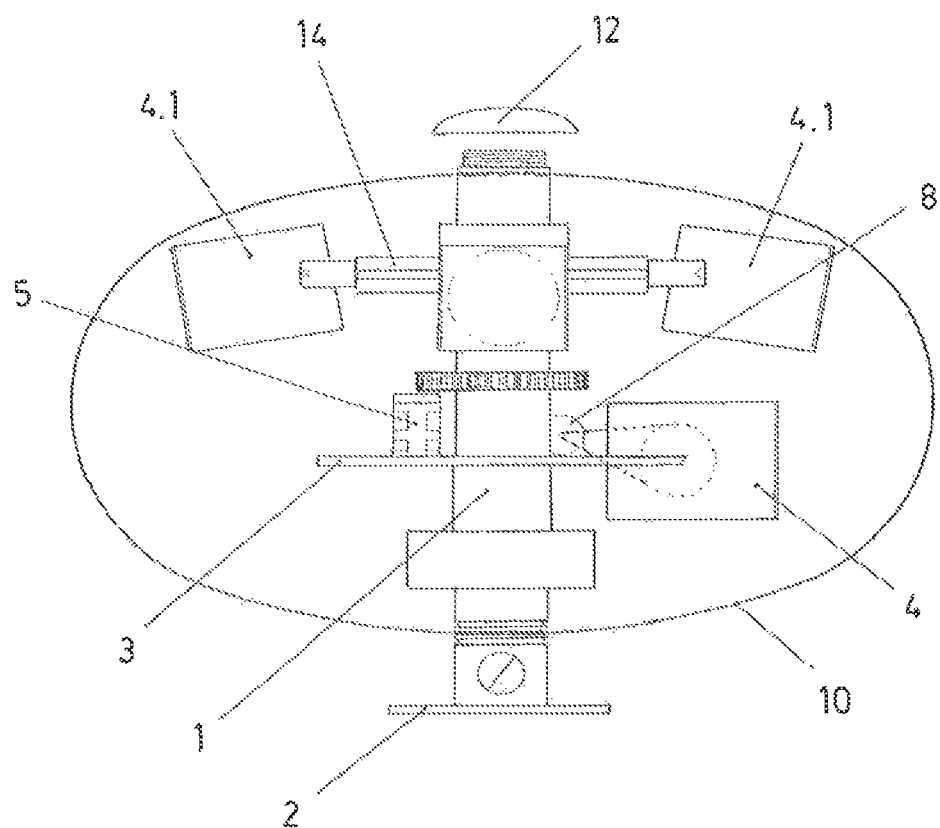
FIG. 5 shows an embodiment of the support provided with a functional assembly formed with a moving video camera and additional fixed video cameras.

The functional assembly of the support can furthermore be complemented with fixed video cameras (4.1), the possibility of arranging an accessory frame (14) secured to the supporting column (1) being envisaged for such purpose in order to arrange in said accessory frame (14) one or more fixed video cameras (4.1), as seen in FIG. 5. A mixed video surveillance system having one or more moving video cameras (4) the orientation of which can be changed selectively in a continuous manner or between specific positions, and one or more fixed video cameras (4.1) that complement observation of the surrounding area by the system is thus determined, therefore increasing system efficiency for the video surveillance function.

The invention claimed is:

1. A video surveillance arrangement, comprising:
    a vertical supporting column having two ends and provided with an anchoring base at one of the two ends;
    a horizontal disc having a rotation-actuating motor, wherein the horizontal disc is rotationally assembled on said supporting column between the two ends of the supporting column;
    at least one video camera having a respective swivel-actuating motor, wherein the video camera is vertically swivel-mounted on a periphery of the horizontal disc, and the video camera is disposed apart from an axis of the supporting column; and
    a transparent protective bubble mounted on the supporting column with gaskets between the two ends of the supporting column, the horizontal disc and the camera being inside the bubble and the two ends of the supporting column and the anchoring base being outside the bubble.

2. The video surveillance arrangement according to claim 1, wherein the anchoring base is removable, being able to be placed at either of the two ends of the supporting column to arrange the support such that the support is supported by a lower portion of the support or such that the support is hung from an upper portion of the support.

3. The video surveillance arrangement according to claim 1, wherein the rotation-actuating motor of the disc is arranged on the actual disc, meshing with a pinion with respect to an annular gear ring arranged on the supporting column.

4. The video surveillance arrangement according to claim 1, wherein the vertical swivel-actuating motor of the video camera is arranged on the disc, being connected with the video camera by means of a belt transmission.

5. The video surveillance arrangement according to claim 1, wherein a visor cover is arranged on the supporting column, above the transparent bubble.

6. The video surveillance arrangement according to claim 1, wherein an accessory frame is secured to the supporting column, and one or more fixed video cameras are incorporated in the accessory frame, the accessory frame and the one or more fixed video cameras are in the bubble.

* * * * *